(12) United States Patent
Garvey

(10) Patent No.: US 6,986,122 B2
(45) Date of Patent: Jan. 10, 2006

(54) IF STATEMENT HAVING AN EXPRESSION SETUP CLAUSE TO BE UTILIZED IN STRUCTURED ASSEMBLY LANGUAGE PROGRAMMING

(75) Inventor: Joseph Franklin Garvey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/876,366

(22) Filed: Jun. 7, 2001

(65) Prior Publication Data

US 2003/0084426 A1    May 1, 2003

(51) Int. Cl.
*G06F 9/44*      (2006.01)

(52) U.S. Cl. .................................................. 717/112

(58) Field of Classification Search ............ 717/112, 717/114, 130–149
See application file for complete search history.

(56) References Cited

U.S. PATENT DOCUMENTS

| | | | | |
|---|---|---|---|---|
| 4,099,230 A | * | 7/1978 | Mead ........................... | 714/38 |
| 4,636,940 A | * | 1/1987 | Goodwin, Jr. ................ | 717/128 |
| 4,885,684 A | * | 12/1989 | Austin et al. ................. | 717/149 |
| 5,598,564 A | * | 1/1997 | Barker, III .................... | 717/126 |
| 6,061,514 A | | 5/2000 | Kuno | |
| 6,122,356 A | * | 9/2000 | James ..................... | 379/201.01 |
| 6,179,490 B1 | * | 1/2001 | Pruitt ............................ | 717/109 |
| 6,666,383 B2 | * | 12/2003 | Goff et al. .................... | 235/492 |
| 6,718,533 B1 | * | 4/2004 | Schneider et al. ........... | 717/100 |

OTHER PUBLICATIONS

Johnstone, Adrian, Scott, Elizabeth, Womack, Tim, "What assembly language programmers get up to: control flow challenges reverse compilation", Software Maintenance and Reengineering, 2000, retrieved from IEEE Jul. 7, 2004.*

Mackenzie, Scott, "A Structured Approach to Assembly Language Programming", p. 123-128, 1988 IEEE, retrieved Jul. 7, 2004.*

Yuen, RYK, Yew, WWC, Hon, NC, Endo, S,"Assembly Language Software Development System", p. 138-141, Panasonic Singapore Laboratories Pte Ltd & Matsushita Electronics (S) Pte Ltd, 1997 IEEE, retireved Jul. 7, 2004.*

"IEEE Standard for Microprocessor Assembly Language", Jun. 1985, p. 5-12, retrieved from IEEE Jul. 7, 2004.*

Swan, Tom; "Mastering Turbo Assembler", Hayden Books, 1989, p. 111.*

*Assembler Compiler Facility for Integrated User Written Preprocessor*, IBM Technical Disclosure Bulletin, Jan. 1974, pp. 2614-2615.

*Fast Assembler Using APL*, IBM Technical Disclosure Bulletin, Jun. 1977, pp. 368-372.

*Process to Convert Assembler Language Programs to Decision Tables*, IBM Technical Disclosure Bulletin, Dec. 1977, pp. 2654-2658.

(Continued)

*Primary Examiner*—Tuan Dam
*Assistant Examiner*—Mary Steelman
(74) *Attorney, Agent, or Firm*—Joscelyn G. Cockburn; Dillon & Yudell LLP

(57) ABSTRACT

A state machine for an assembler capable of processing structured assembly language is disclosed. The state machine for an assembler capable of processing structured assembly language IF constructs includes five states, namely, an IF state, an ELSE state, an END_IF state, an ELSE_IF state, and a SETUP_IF state. In response to recognizing a SETUP_IF clause during the IF state or the ELSE_IF state, the process transitions to the SETUP_IF state. In response to recognizing an ELSE_IF clause during the SETUP_IF state, the process transitions to the ELSE_IF state.

16 Claims, 3 Drawing Sheets

OTHER PUBLICATIONS

*General Purpose Assember for Microprocessors*, IBM Technical Disclosure Bulletin, Jan. 1979, pp. 3356-3357.
*Functional Binary Assembler*, IBM Technical Disclosure Bulletin, Oct. 1991, pp. 259-261.
*Analysis of Complex Assembler Programs*, IBM Technical Disclosure Bulletin, Nov. 1991, pp. 98-100.
Assembler Macro Implementation, IBM Technical Disclosure Bulletin, May 1994, pp. 19-28.

* cited by examiner

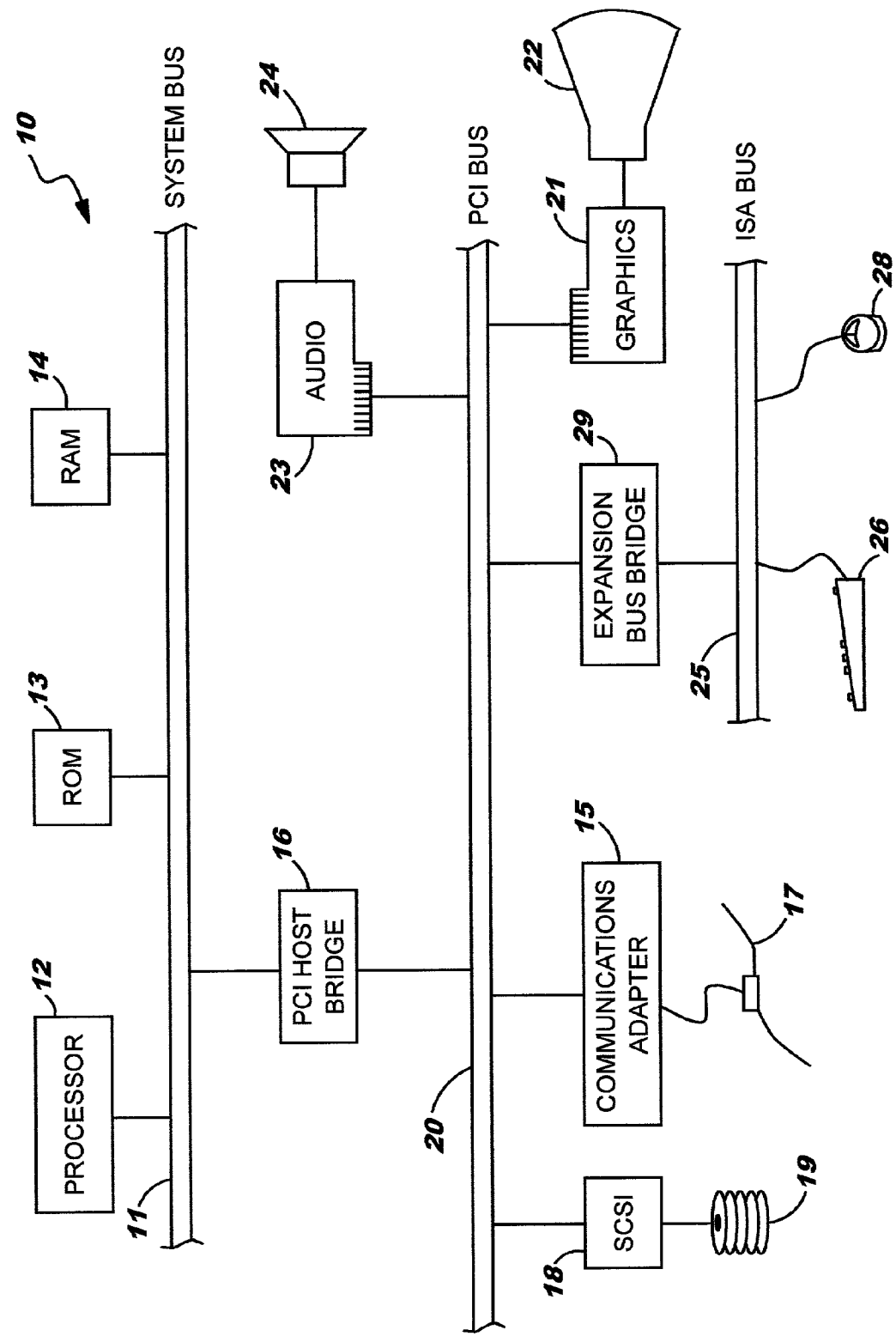

IF STATEMENT HAVING AN EXPRESSION SETUP CLAUSE TO BE UTILIZED IN STRUCTURED ASSEMBLY LANGUAGE PROGRAMMING

BACKGROUND OF THE INVENTION

1. Technical Field

The present invention relates to assembly programming in general, and in particular to structured assembly language programming. Still more particularly, the present invention relates to an IF construct having an expression setup clause to be utilized in structured assembly language programming.

2. Description of the Prior Art

Structured assembly language programming is an improvement to the basic syntax of conventional assembly language programming. In essence, structured assembly language programming allows the use of structured programming constructs similar to those generally found in high-level programming languages such as Pascal or C.

One of the structured programming constructs is the well-known IF construct. It consists of an IF clause followed by zero or more ELSE_IF clauses, an optional ELSE clause, and an END_IF statement. The simplest structured assembly language IF construct is typically utilized as follows:

```
condition setup assembly language code
IF (condition)
    conditionally executed assembly language code
END_IF
unassociated with IF assembly language code
``` where condition contains structured assembly language expression(s) for generating comparison opcodes (i.e., opcodes that set the processor's flags) and/or branch opcodes. Only comparison opcodes and branch opcodes are used in the implementation of a structured assembly language expression. An assembler then converts the above-mentioned structured assembly language IF construct to a group of processor opcodes as follows (in assembler mnemonics):

```
condition setup assembly language code
cmp r0,#7 ; (r0 == 7) || (r1 < r2)
bnz falselabel
cmp r1,r2
bge falselabel
    conditionally executed assembly language code
falselabel equ $
```

In this example, the condition compares a processor register to a numeric value, and a comparison also occurs between two processor registers. The condition is (r0==7) or (r1<r2). One important difference between a structured assembly language IF construct and an IF construct from a high-level programming language is that a programmer is responsible for register setup so the structured assembly language expression, that is the condition, is only made up of comparison opcodes and/or branch opcodes. In fact, such kind of optimization capability is a key reason for choosing assembly language in the first place. The need to execute opcodes to setup for a structured assembly language expression is a real problem when multiple conditions must be tested. In order to test many different conditions using structured assembly language under the prior art, a nested testing scheme is required, and the code will resemble the following:

```
condition setup code1
IF (condition1)
    conditionally executed code1
ELSE
    condition setup code2
    IF (condition2)
        conditionally executed code2
    ELSE
        condition setup code3
        IF (condition3)
            conditionally executed code3
        ELSE
            condition setup code4
            IF (condition4)
                conditionally executed code4
            ELSE
                condition setup code5
                IF (condition5)
                    conditionally executed code5a
                ELSE
                    conditionally executed code5b
                END_IF
            END_IF
        END_IF
    END_IF
END_IF
```

It becomes obvious that multiple testing conditions are awkward to code in structured assembly language when standard programming conventions for indentation are followed. The awkward form of coding also makes the task of understanding code and the task of maintaining code more difficult. Consequently, it would be desirable to provide an improved IF statement to be utilized in structured assembly language programming for coding multiple testing conditions.

SUMMARY OF THE INVENTION

In accordance with a preferred embodiment of the present invention, a state machine for an assembler capable of processing structured assembly language IF constructs includes five states, namely, an IF state, an ELSE state, an END_IF state, an ELSE_IF state, and a SETUP_IF state. In response to recognizing a SETUP_IF clause during the IF state or the ELSE_IF state, the process transitions to the SETUP_IF state. In response to recognizing an ELSE_IF clause during the SETUP_IF state, the process transitions to the ELSE_IF state.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a block diagram of a computer system to which a preferred embodiment of the present invention can be applied.

DETAILED DESCRIPTION OF A PREFERRED EMBODIMENT

Figure 1:
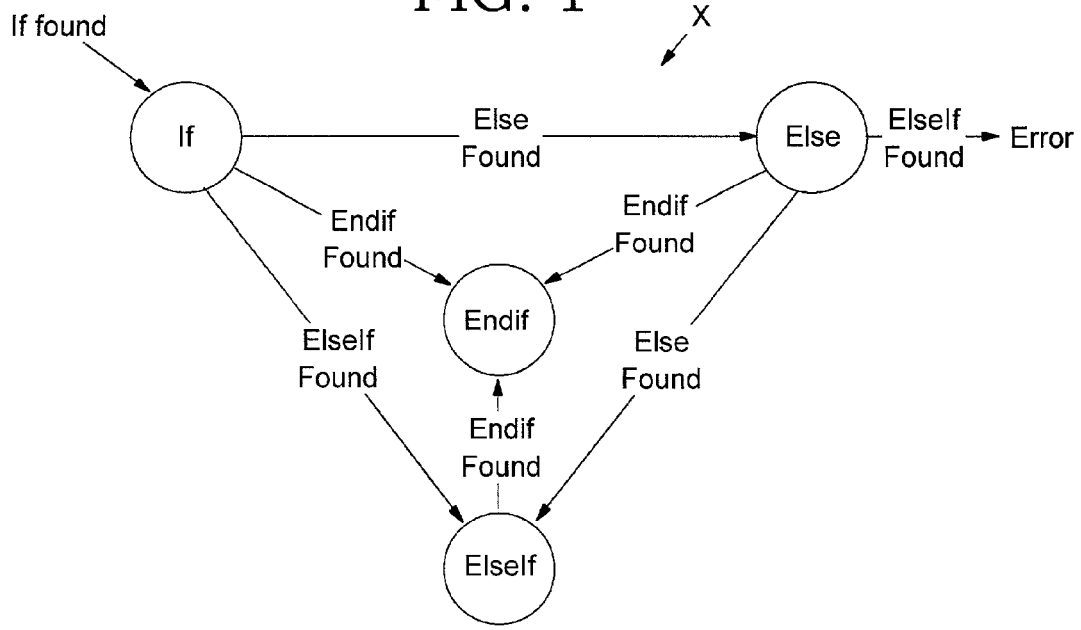
FIG. 1 is a state machine for the standard structured assembly language IF construct.

A more specific example of nested testing, using a standard programming indentation convention, is shown below:

```
        ldr r0, [r2+0]          ;0
        IF (r0 <ne> #7)
            add r1,#1
        ELSE
            ldr r0, [r2+3]      ;1
            IF (r0 <ge> #3)
                add r1,#2
            ELSE
                ldr r0, [r2+5]  ;2
                IF (r0 <le> #1)
                    add r1, #3
                ELSE
                    add r1,#4
                END_IF
            END_IF
        END_IF
```

A careful examination of the above-shown nested testing reveals that each IF construct is inside an ELSE clause. Thus, the logic is really IF-ELSEIF-ELSEIF . . . ENDIF. Unfortunately, the nested structured assembly language IF constructs hide this fact.

In accordance with a preferred embodiment of the present invention, a SETUP_IF clause is introduced to eliminate the confusion caused by the nested IFs, and to restore the logic to a form that truly represents what is happening. The modified IF construct using the SETUP_IF clause consists of an IF clause followed by an optional SETUP_IF clause preceding an ELSE_IF clause, an optional ELSE clause, and an END_IF statement. The pair of clauses, an optional SETUP_IF clause followed by an ELSE_IF clause, may appear zero or more times immediately following the IF clause, as follows:

```
    condition setup code1
    IF (condition1)
        conditionally executed code1
    SETUP_IF  ;branch endif, label for "condition1 is false"
        condition setup code2
    ELSE_IF (condition2)
        conditionally executed code2
    SETUP_IF  ;branch endif, label for "condition2 is false"
        condition setup code3
    ELSE_IF (condition3)
        conditionally executed code3
    SETUP_IF  ;branch endif, label for "condition3 is false"
        condition setup code4
    ELSE_IF (condition4)
        conditionally executed code4
    ELSE_IF (condition5)
        conditionally executed code5a
    ELSE      ;branch endif, label for "condition5 is false"
        conditionally executed code5b
    END_IF    ;label for endif, label for "condition6 is false"
```

The SETUP_IF statement, at the start of the SETUP_IF clause, is converted by an assembler to a branch to END_IF label. The SETUP_IF statement will also define the false-label needed by the previous structured assembly language expression. If condition1 is true, code1 is then executed. The branch END_IF code generated by the SETUP_IF statement immediately following the IF clause is then executed. If condition 1 is false, the code for condition1 will branch to the falselabel1 generated by the SETUP IF statement immediately following the IF clause. Execution will continue with setup code2. The above-mentioned pattern is repeated for all instances of the SETUP_IF clause in the modified structured assembly language IF construct.

The above-mentioned multiple testing condition example can be coded using SETUP_IF clauses, as follows:

```
        ldr r0, [r2+0]              ;0
        IF (r0 <ne> #7)
            add r1,#1
        SETUP_IF
            ldr r0, [r2+3]          ;1
        ELSE_IF (r0 <ge> #3)
            add r1,#2
        SETUP_IF
            ldr r0, [r2+5]          ;2
        ELSE_IF (r0 <le> #1)
            add r1,#3
        ELSE
            add r1,#4
        END_IF
```

Compared with the previous code, the new code does not have a requirement for the programmer to balance multiple IF with multiple END_IF statements. Thus, without the present invention, each condition tested requires the assembler to keep and to track an instance of an IF construct. But with the present invention, only a single IF construct is required. Because structured assembly language, like structured programming, is block-oriented, each new IF statement is a new unique block. Each structured assembly language block requires the assembler to track the state of the a block, to generate and remove the block and its related information, and to allocate and consume assembler resources. Fewer nested structured assembly language blocks means fewer resources are required by the assembler.

Generally speaking, structured assembly language is implemented through program labels, pattern generated code, a stack for structured programming blocks, and a simple state machine for each different type of structured assembly language construct. The structured assembly language IF construct is no exception. Thus, the present invention can also be compared with the prior art from a state machine point of view. The state machine for the standard structured assembly language IF construct is depicted in FIG. 1. As shown, a state machine x has four states, namely, an IF state, an ELSE state, an END_IF state, and an ELSE_IF state. Each state represents a clause in an IF construct. Steps and actions for each state are summarized in Table I.

TABLE I

| State | Description of Steps for state |
|-------|-------------------------------|
| IF | 1) Push new block on structured assembly block stack |
|    | 2) Generate a new and unique NextClauseLabel (false label) |
|    | 3) Generate EndIfLabel |
|    | 4) Emit opcode(s) for condition |

TABLE I-continued

| State | Description of Steps for state |
|---|---|
| ELSEIF | 1) Emit jump to EndIfLabel<br>2) Set NextClauseLabel (next false label)<br>3) Generate a new and unique NextClauseLabel (false label)<br>4) Emit opcode(s) for condition |
| ELSE | 1) Emit jump to EndIfLabel<br>2) Set NextClauseLabel (false label) |
| ENDIF | 1) Set NextClauseLabel (false label)<br>2) Set EndIfLabel<br>3) Pop current block off structured assembly block stack |

Figure 2:
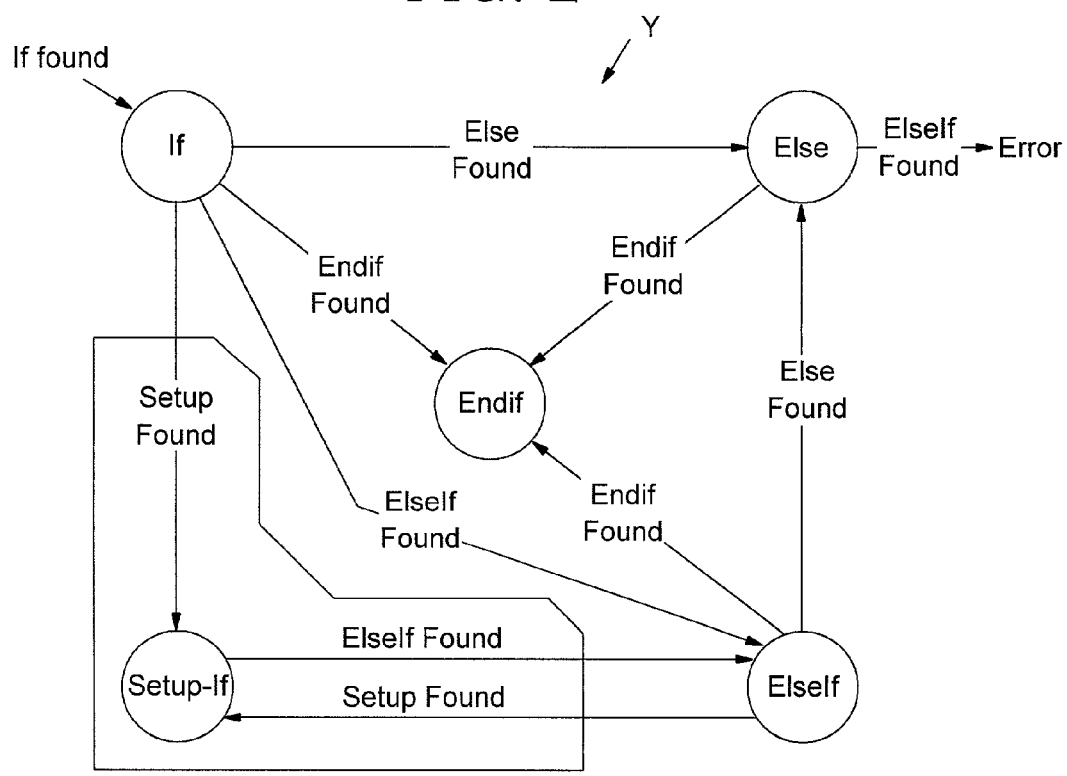
FIG. 2 is a state machine for a structured assembly language IF construct in accordance with a preferred embodiment of the present invention.

In accordance with a preferred embodiment of the present invention, the state machine of the present invention is depicted in FIG. 2. As shown, a state machine y has five states, namely, an IF state, an ELSE state, an END_IF state, an ELSE_IF state, and a SETUP_IF state. Each state represents an IF construct clause. Steps and actions for each state is summarized in Table II.

TABLE II

| State | Description of Steps for state | Status |
|---|---|---|
| IF | 1) Push new block on structured assembly block stack<br>2) Generate NextClauseLabel (false label)<br>3) Generate EndIfLabel<br>4) Emit opcode(s) for condition | unchanged |
| SETUP | 1) Emit jump to EndIfLabel<br>2) Set NextClauseLabel (false label)<br>3) Generate a new and unique Next ClauseLabel (false label) | new |
| ELSEIF | 1) Emit jump to EndIfLabel if previous state was not setup<br>2) Set NextClauseLabel<br>3) Generate a new and unique NextClauseLabel (false label)<br>4) Emit opcode(s) for condition | modified |
| ELSE | 1) Emit jump to EndIfLabel<br>2) Set NextClauseLabel | unchanged |
| ENDIF | 1) Set NextClauseLabel<br>2) Set EndIfLabel<br>3) Pop current block off structured assembly block stack | unchanged |

One of the virtues of structured assembly programming is that the internal structures representing constructs in structured assembly language can be stored in a stack. Each structured assmebly language construct or block needs to be indentified by a type, and the construct's internal state needs to be recorded, and two labels are required, one label for the next clause and one label for the end of the construct. The manipulation of those values is shown in Table I and Table II. As shown, the nature of the elements in a tuple that holds the state of the IF construct state machine remains unchanged.

Figure 3:
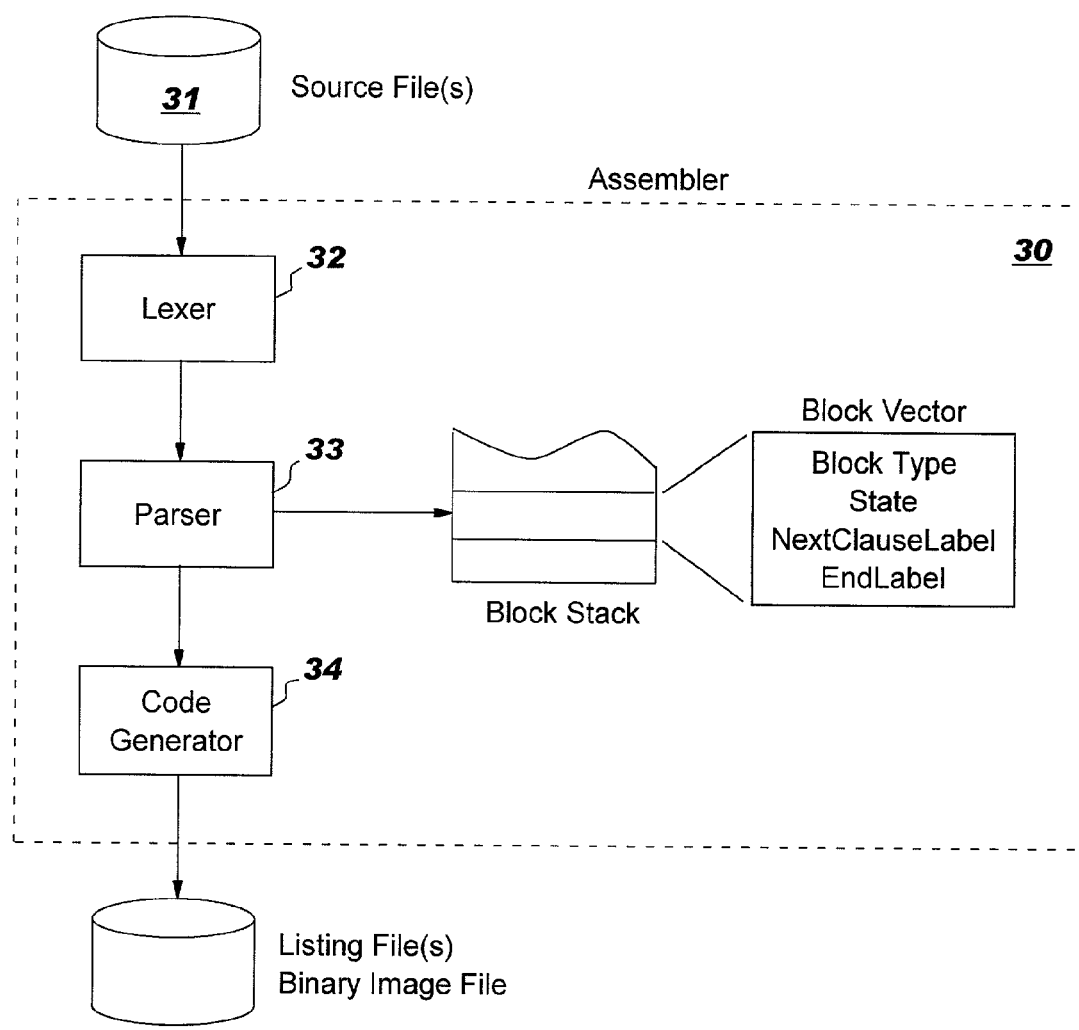
FIG. 3 is a block diagram of an assembler to which a preferred embodiment of the present invention can be applied.

The relationship between the state values of a structured assembly language construct and an assembler is shown in FIG. 3, there is illustrated a block diagram of an assembler to which a preferred embodiment of the present invention can be applied. As shown, an assembler 30 includes a lexer 32, a parser 33, and a code generator 34. User source files 31 are broken down into tokens by lexer 32. Groups of tokens are recognized as statements in the grammar of the programming language by parser 33. Internal structures built up by parser 33 and lexer 32 are then processed into code by code generator 34, thereby generating listing and binary image files that are the work product of assembler 30.

An assembler, such as assembler 30, capable of processing structured assembly language may be executed in a variety of data processing systems under a number of different operating systems. The computer may be, for example, a personal computer, a midrange computer or a mainframe computer. In addition, the computer may be a stand-alone system or part of a network such as a local-area network (LAN) or a wide-area network (WAN).

With reference now to FIG. 4, there is depicted a block diagram of a computer system 10 in which a preferred embodiment of the present invention is applicable. As shown, a processor 12, a read-only memory (ROM) 13, and a random access memory (RAM) 14 are connected to a system bus 11. Processor 12, ROM 13, and RAM 14 are also coupled to a peripheral component interconnect (PCI) bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14.

In addition, an audio adapter 23 and a graphics adapter 21 may be attached to PCI bus 20. Graphics adapter 21 controls visual output through a video monitor 22 and 25 audio adapter 20 controls audio output through a speaker 24. Also attached to PCI bus 20 is a communications adapter 15 and a small computer system interface (SCSI) 18. Communications adapter 15 connects computer system 10 to a local-area network (LAN) 17. SCSI 18 is utilized to control a high-speed SCSI disk drive 19. Expansion bus bridge 29, such as a PCI-to-ISA bus bridge, may be utilized for coupling an industry standard architecture (ISA) bus 25 to PCI bus 20. As shown, a keyboard 26 and a mouse 28 are attached to ISA bus 25 for performing certain basic I/O functions.

As has been described, the present invention provides a SETUP_IF clause, which is an ELSE_IF clause having an expression setup clause, to be utilized in structured assembly language programming.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A computer program product residing on a computer recordable medium for processing structured assembly language, said computer program product comprising:
   program code means for implementing a state machine having an IF state, an ELSE state, an END_IF state, an ELSE_IF state, and a SETUP_IF state;
   program code means for transitioning from said IF state or said ELSE_IF state to said SETUP_IF state, in response to recognizing a SETUP_IF clause; and program code means for transitioning from said SETUP_IF state to said ELSE_IF state, in response to recognizing an ELSE_IF clause.

2. The computer program product of claim 1, wherein said computer program product further includes program code means for transitioning from said IF state to said ELSE state, in response to recognizing an ELSE clause.

3. The computer program product of claim 1, wherein said computer program product further includes program code means for transitioning from said IF state to said END_IF state, in response to recognizing an END_IF statement.

4. The computer program product of claim 1, wherein said computer program product further includes program code means for transitioning from said IF state to said ELSE_IF state, in response to recognizing an ELSE_IF clause.

5. The computer program product of claim 1, wherein said computer program product further includes program code means for transitioning from said ELSE state to said END_IF state, in response to recognizing an END_IF statement.

6. The computer program product of claim 1, wherein said computer program product further includes program code means for transitioning from said ELSE_IF state to said END_IF state, in response to recognizing an END_IF statement.

7. The computer program product of claim 1, wherein said computer program product further includes program code means for transitioning from said ELSE_IF state to said ELSE state, in response to recognizing an ELSE clause.

8. A data processing system having an assembler for processing structured assembly language, said data processing system comprising:

a state machine having an IF state, an ELSE state, an END_IF state, an ELSE_IF state, and a SETUP_IF state;

means for transitioning from said IF state or said ELSE_IF state to said SETUP_IF state, in response to recognizing a SETUP_IF clause; and means for transitioning from said SETUP_IF state to said ELSE_IF state, in response to recognizing an ELSE_IF clause.

9. The data processing system of claim 8, wherein said data processing system further includes means for transitioning from said IF state to said ELSE state, in response to recognizing an ELSE clause.

10. The data processing system of claim 8, wherein said data processing system further includes means for transitioning from said IF state to said END_IF state, in response to recognizing an END_IF statement.

11. The data processing system of claim 8, wherein said data processing system further includes means for transitioning from said IF state to said ELSE_IF state, in response to recognizing an ELSE_IF clause.

12. The data processing system of claim 8, wherein said data processing system further includes means for transitioning from said ELSE state to said END_IF state, in response to recognizing an END_IF statement.

13. The data processing system of claim 8, wherein said data processing system further includes means for transitioning from said ELSE_IF state to said END_IF state, in response to recognizing an END_IF statement.

14. The data processing system of claim 8, wherein said data processing system further includes means for transitioning from said ELSE_IF state to said ELSE state, in response to recognizing an ELSE clause.

15. An assembler residing in a data processing system for processing structured assembly language, said assembler comprising:

means for implementing a state machine having an IF state, an ELSE state, an END IF state, an ELSE IF state, and a SETUP IF state:

means for identifying a, SETUP_IF clause;

means for associating said identified SETUP_IF clause with an ELSE_IF clause having a test condition; and means for inserting instructions from said identified SETUP_IF clause prior to the test condition of said ELSE_IF clause where said ELSE_IF clause logically follows a prior IF clause or a prior ELSE_IF clause.

16. A computer program product residing on a computer recordable medium for processing structured assembly language, said computer program product comprising:

program code means for implementing a state machine having an IF state, an ELSE state, an END_IF state, an ELSE_IF state, and a SETUP_IF state;

program code means for identifying a SETUP_IF clause;

program code means for associating said identified SETUP_IF clause with an ELSE_IF clause having a test condition; and a program code means for inserting instructions from said identified SETUP_IF clause prior to the test condition of said ELSE_IF clause where said ELSE_IF clause logically follows a prior IF clause or a prior ELSE_IF clause.

* * * * *